INVENTOR.
*IYETSUNE TSUBOKAWA*
BY
*Ward, Neal, Haselton Orme & McElhannon*
ATTORNEYS.

INVENTOR.
IYETSUNE TSUBOKAWA.

United States Patent Office 3,059,520
Patented Oct. 23, 1962

3,059,520
AUTOMATIC LEVELING APPARATUS
Iyetsune Tsubokawa, Kanyuchi, 7-chome, Yatsu,
Narashino-shi, Chiba-ken, Japan
Filed July 26, 1957, Ser. No. 674,420
Claims priority, application Japan Aug. 21, 1956
5 Claims. (Cl. 88—1)

This invention relates to apparatus for automatic leveling of the collimation line of an optical instrument. The collimation line for purposes of this disclosure and the appended claims may be considered as being the line passing through the image side nodal point of the objective and the point of reference at the focus. One aspect of this invention relates to automatic leveling of the collimation line of a telescope.

Many optical devices have been developed which enable the operator to obtain a horizontal or nearly horizontal line of sight. Such devices are extensively used in surveying and construction work as well as for aligning jigs and performing other industrial functions. For many such uses extreme accuracy is necessary with tolerances in many cases being on the order of thousandths of an inch or less. Previous instruments designed to afford a horizontal line of sight have generally been so constructed that the collimation line coincided with the optical axis of the instrument. In order to level the collimation line of such instruments, it is necessary to level the entire optical system of the instrument with the required degree of accuracy. This is usually done by the use of cross bubble leveling systems. Such methods of leveling frequently take an excessive amount of time, especially where the instrument, once leveled, need only be used for a relatively short time. In addition, any slight disturbance of the foundation on which the instrument is resting or of the instrument itself destroys the horizontal line of sight thus obtained and necessitates releveling of the instrument.

According to one aspect of this invention, the collimation line of an optical instrument is automatically leveled by the use of apparatus comprising an objective; a reference element, such as a cross hair, located in the image space of the objective at a point corresponding to the image side nodal point thereof; means for observing the reference element; and reflecting means located within the image space of the objective and adapted to reflect horizontal rays emitted from the image side nodal point through said point.

The reference element located in the image space of the objective in accordance with this invention is preferably a conventional horizontal cross wire or cross hair, but may be of any other form which will provide a suitable reference point or line.

The point corresponding to the image side nodal point of the objective may be either the image side nodal point itself of the reflected image of the nodal point, the reflected image being an image which is produced at a location laterally displaced from the optical axis of the objective by reflection from a deflecting plane of a prism located in fixed relation with respect to the objective and in position to intercept such image producing rays. When the nodal point is located in the image space of the objective, it is preferred to place the reference cross wire at the nodal point although a reflected image of the nodal point may be used for this purpose if desired. When the nodal point is located within the objective or an element thereof, the cross wire may be placed at the reflected image of the nodal point as above described.

It is important that the cross wire be located nearly at the nodal point on image side or at the reflected image thereof since rays which do not pass through the nodal point of an objective do not necessarily have their incident and emergent parts parallel. When the cross wire is located at a point corresponding to the image side nodal point in accordance with the invention, only those incident rays which are horizontal will have their emergent parts reflected back through the nodal point or its reflected image.

In the operation of an instrument constructed in accordance with this invention, horizontal rays will be reflected as described above and the image formed by such rays will be obscured by the cross wire thus providing an extremely accurate horizontal line of sight. For ease and accuracy of observation, the image formed by the objective is preferably in a plane passing through the point corresponding to the nodal point at which the cross wire is placed. An eyepiece can then be focused simultaneously on both the image and the cross wire.

Any suitable means may be used to observe the reference cross hair and the image formed in the same plane. Such observing means preferably includes a magnifying eyepiece in order to allow greater accuracy of observation. A prism is preferably used to deflect the reflected image away from the optical axis of the objective so that the eyepiece and the observer using it do not interfere with the passage of rays within the image space of the objective. Such a prism may be placed so that the rays reflected from the reflecting means are deflected towards the eyepiece with the cross wire being between the prism and the eyepiece or the prism may be placed so that the cross wire is between the prism and the reflecting means. In the latter case the entire image including that of the cross wire will be deflected towards the eyepiece by the prism.

The reflecting means used as described above to reflect horizontal rays through a point corresponding to the nodal point includes a reflecting plane such as a mirror which is pendulously suspended in the gravitational field by any suitable means such as a thread or a knife edge. The mirror or other reflecting plane can be pendulously suspended in either a vertical or horizontal position. If the mirror is suspended in a horizontal position, it is necessary to deflect the horizontal rays entering the instrument through a 90° angle. This may be accomplished with any suitable arrangement of optical elements but a pentaprism is preferred for this purpose due to the ability of this type of prism to bend the ray exactly 90° regardless of its small inclination. It should be understood that the term "horizontal ray" as used in this specification and the appended claims refers to a ray which is horizontal at the time it enters the instrument regardless of whether it may be deflected within the instrument as described above.

When reflecting means as described above are used in accordance with this invention, only horizontal rays passing through the nodal point of the objective will be reflected back through the point corresponding to the nodal point at which the cross wire is located. Other rays will not be reflected through the point corresponding to the nodal point and consequently the image formed by such rays will not be obscured by the cross wire. Since the cross wire obscures only the image formed by horizontal rays, the result is that the collimation axis of an instrument employing this invention remains horizontal, i.e., level, even if the optical axis of the objective is not horizontal. The collimation line of an instrument such as the telescope on a surveyor's level or transit thus remains level even though the instrument itself is not completely level and even though the level of the instrument is disturbed during use. Since by the use of this invention it is not necessary to completely level the instrument prior to use, a considerable saving of time in setting up the instrument for a reading can frequently be realized. Also changes in the level of the instrument due to soft ground or other disturbances during the taking of a reading will not disturb the level of the collimation line. This feature is especially important in high order survey work where readings are frequently taken many times to obtain a more accurate average.

Various further and more specific objects, features and advantages of this invention will appear from the description taken in connection with the accompanying drawings which form a part of this specification and illustrate by way of example certain embodiments of this invention. The invention consists in such novel features and combinations as may be shown and described in connection with the apparatus herein disclosed.

For a better understanding of the invention, reference should be had to the accompanying drawings which are diagrammatic illustrations in which equipment is shown in elevation of suitable arrangements of apparatus for use in various embodiments of this invention.

Figure 1A:
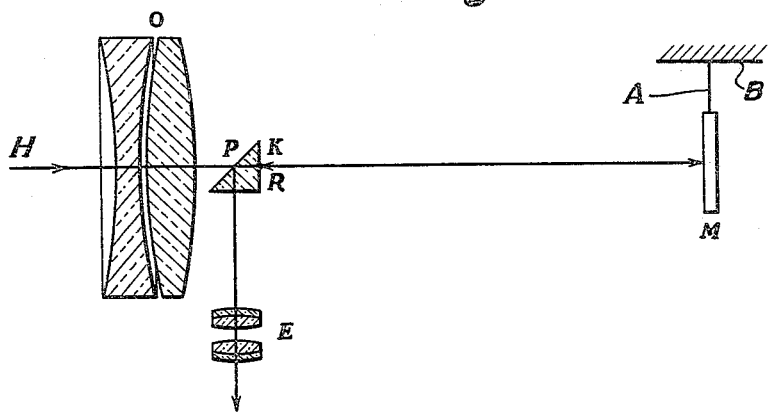
FIG. 1a illustrates an arrangement of apparatus in which the reflecting plane is suspended vertically in the gravitational field and the image side nodal point of the objective is located in the image space thereof.
Figure 1E:
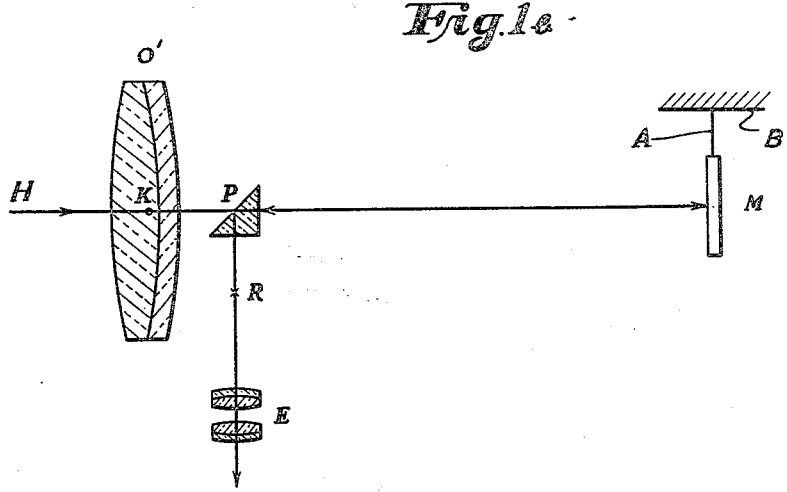
FIG. 1b illustrates an arrangement of apparatus in which the reflecting plane is suspended vertically in the gravitational field and the nodal point of the objective is located within the objective.

Referring to FIG. 1a, the apparatus shown is an optical system contained in a telescope. In FIG. 1a, K is the image side nodal point of an objective O; P is a prism; E is an eyepiece; R is a cross wire passing through point K and M is a mirror which is pendulously suspended as by a thread A from a telescope wall or housing B. A horizontal ray H entering the objective O is emitted from K and is reflected by the mirror M. Since the incident and emergent parts of any ray passing through the object side and image side nodal points are parallel, the ray emitting from K is horizontal. Because the mirror M is freely suspended in the gravitational field, the horizontal ray emitting from K will be reflected horizontally and will thus pass back through K. It should be noted that this will occur even though the optical axis of the system may be inclined slightly from the horizontal as when the telescope is tilted up or down. Any ray which is not a horizontal ray, that is, which does not have its incident part horizontal, will not be horizontal in the image space after it has passed through point K and so will not be reflected back through point K by the mirror M. The mirror M is located at such a distance from point K that the image formed by the objective O and mirror M is formed on a plane passing through K. The prism P is so placed that rays passing from the objective to the mirror are not deflected while rays passing from the mirror towards the objective are deflected toward the eyepiece E. The prism P allows the eyepiece E to be placed to one side so that the image and cross wire can be observed without interfering with the passage of the rays through the optical system. Eyepiece E is a magnifying eyepiece so that more accurate observation is possible. By looking through the eyepiece E the cross wire R will appear to obscure the portion of the image which is produced by horizontal rays thus automatically leveling the collimation line regardless of the inclination of the axis of the objective and producing a horizontal line of sight with an extreme degree of accuracy. If desired the prism P may be placed between the mirror M and the nodal point K as shown in FIG. 1b.

Referring to FIG. 1b, the arrangement of apparatus is substantially the same as shown in FIG. 1a, except that the use of an objective O' having its image side nodal point within itself requires that the cross wire R be placed at the reflected image of the nodal point K rather than at the nodal point itself.

Figure 2A:
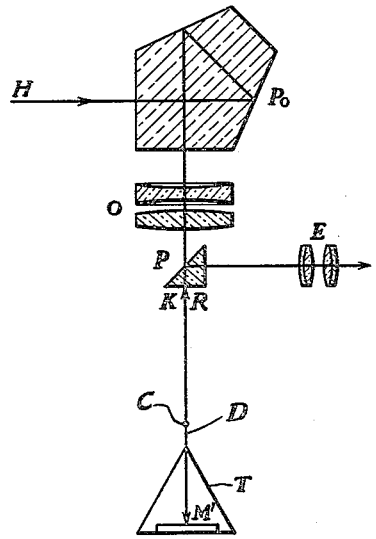
FIG. 2a illustrates an arrangement of apparatus in which the reflecting plane is suspended horizontally in the gravitational field and the nodal point of the objective is located in the image space thereof.

In FIG. 2a, the horizontal ray H entering the instrument is deflected downwardly through an angle of 90° by a penta prism $P_0$. The ray then passes through objective O and the image portion of it emitting from K, the image side nodal point of O, is reflected from a mirror M' which is suspended horizontally in the gravitational field from a pin C by a thread D and a pendulum T. The reflected horizontal ray passes back through point K and is deflected to eyepiece E by prism P as in FIG. 1a. As in FIG. 1a, cross wire R passes through K and the image formed by objective O is formed on a plane passing through the nodal point.

Figure 2B:
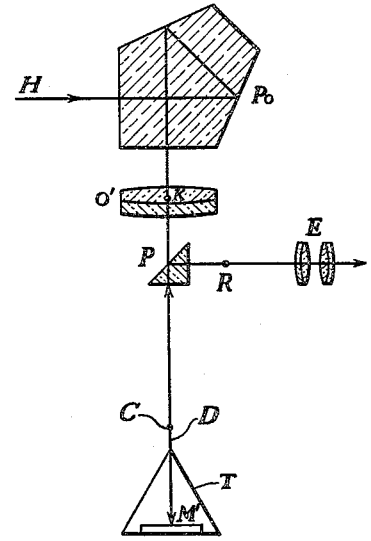
FIG. 2b illustrates an arrangement of apparatus in which the reflecting plane is suspended horizontally in the gravitational field and the nodal point of the objective is located within the objective.

The arrangement of apparatus shown in FIG. 2b is similar to that shown in FIG. 2a except that the use of objective O' having its image side nodal point K within itself requires that the cross wire R be placed at the reflected image of the nodal point rather than at the nodal point itself.

Figure 3:
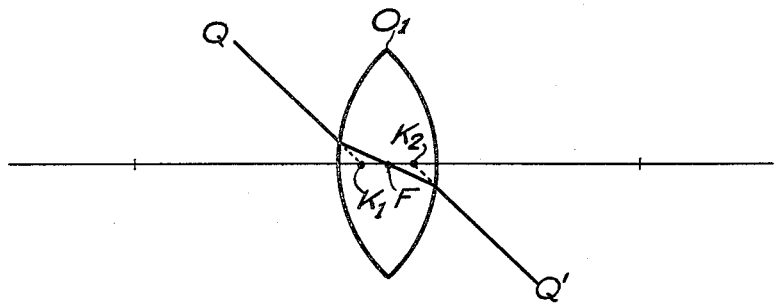
FIG. 3 is a conventional diagrammatic illustration indicating the passage of light rays through an objective lens.

FIG. 3 shows an objective lens $O_1$ having an optical center F and nodal points $K_1$ and $K_2$. A ray $QK_1$ in the object space which is refracted to cross the axis of the lens at the optical center F will, therefore, emerge in the image space as a ray $K_2Q'$ which is parallel to the ray $QK_1$. Likewise, any ray in the object space directed toward $K_1$ emerges in the image space from $K_2$ parallel to its original direction.

Figure 4:
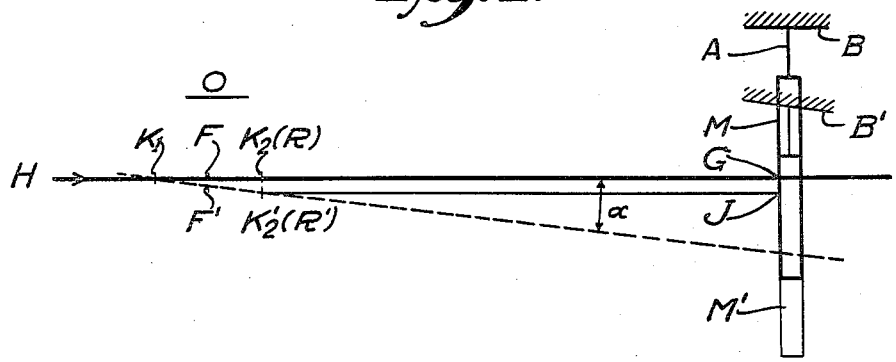
FIG. 4 is a diagrammatic illustration of the operation of the apparatus constructed in accordance with the invention.

FIG. 4 is a diagrammatic illustration showing a telescope having an objective lens similar to the lens $O_1$ shown in FIG. 3 and having a cross-hair R placed at a point corresponding to the image side nodal point $K_2$ of said objective lens. A mirror M is suspended vertically in the gravitational field by a thread A from the telescope wall B. When the optical axis of the telescope is horizontal, a horizontal incident ray H passing through the nodal point $K_1$ in the objective space will be emitted from the nodal point $K_2$ in the image space and returned to $K_2$ from point G on the mirror after being reflected by the mirror M. When the optical axis of the telescope is inclined at an angle alpha around an axis passing through $K_1$ perpendicular to the plane of the drawing, the image side nodal point will shift to $K_2'$ and the cross-hair R will also shift to a point corresponding to $K_2'$ as indicated in FIG. 4. In this case the horizontal incident ray passing toward $K_1$ in the objective space will be emitted from $K_2'$ in the image space and returned to $K_2'$ from point J on the mirror after being reflected by the mirror M. If, therefore, the cross-hair R is located at a point corresponding to the image side nodal point, it will obscure the horizontal ray H in the image plane whether or not the optical axis of the telescope is exactly level and the conditions for automatic leveling of the telescope are thereby satisfied.

It can be seen from FIG. 4 that automatic leveling is obtained only when the cross-hair R is at a point corresponding to the image side nodal point. If the cross-hair R is at any other point, the horizontal ray reflected along the line J when the optical axis is not exactly level will not pass through the point where the cross-hair is located but will rather pass back through the image side nodal point.

Figure 5:
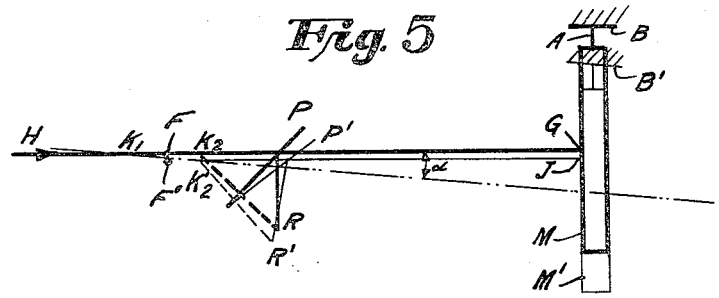
FIG. 5 is a diagrammatic illustration of the operation of the apparatus similar to FIG. 4, but illustrating the apparatus in its modified form wherein the reference element is located at the point of reflected image of the image side nodal point.

FIGURE 5 illustrates the principle of automatic leveling of the collimation line of the telescope shown in FIGS. 1b and 2b, in which the reference element R is located at the point of reflected image of the image side nodal point $K_2$ as it appears after having been deflected by the deflecting plane of the prism P. In other words, the reference element R is located at the deflected image position of image side nodal point $K_2$. It is seen that when the optical axis of the telescope is horizontal, the horizontal ray H passing through the objective side nodal point $K_1$ in a direct line with image side nodal point $K_2$ will be emitted from the nodal point $K_2$ to strike the mirror M at point G from whence it will be reflected back along the same line, thence deflected by the deflecting plane of prism P to appear as an image at the point of the reference element R. When the optical axis of the telescope is inclined at an angle alpha around an axis passing through $K_1$ perpendicular to the plane of the drawing, the image side nodal point $K_2$ will shift to $K_2'$, and the deflecting plane of the prism P will shift to the position indicated by P'. The cross-hair, or reference element R being mounted on the telescope is, of course, in fixed position with respect to the prism P which is also mounted on the telescope, and will also shift to a new, real position R'. In this case, a horizontal incident ray passing through $K_1$ will pass through and be emitted from the actual position $K_2'$ of the image side nodal point, the emerging ray being parallel to the original horizontal incident ray H and therefore striking the mirror M at a point J. Since the mirror M is pendulously suspended, it will always remain vertical although the telescope structure has been tilted at the angle alpha. Consequently, the ray will be reflected back from point J along the same line $K_2'$—J, whereupon the reflected ray will be deflected by the deflecting plane of the prism P in its new position P', and will form an image at the new actual location R' of the reference element. Thus, in all of the embodiments of the invention, the reflected ray is always horizontal, and forms an image at the cross-hair, or reference element R of the telescope in spite of any small inclination of the axis of the telescope.

While the invention has been described in detail with respect to certain preferred embodiments, it will be understood by those skilled in the art that various changes and modifications may be made without departing from the spirit and scope of the invention, and it is intended to cover all such changes and modifications in the appended claims.

I claim:

1. Self-levelling optical apparatus comprising a housing having an interior axis, an objective attached to said housing and having an optical axis parallel to said housing axis, said objective further having an objective side nodal point and an image side nodal point, means for positioning the image normally produced at said image side nodal point at a fixed location exterior of said objective, a reference element mounted within said housing at said location of said image side nodal point image, reflecting means pendulously suspended within said housing and spaced away from said objective, said reflecting means including a reflecting plane surface disposed transversely across said optical axis of the objective to always reflect light rays which emerge from said image side nodal point along a path through said image side nodal point, and reflecting means of said housing disposed within the path of said reflected light rays to deflect the same for observing said reference element, whereby said apparatus is optically self-levelling in respect of its collimation line.

2. Self-levelling optical apparatus comprising a housing having an interior axis, an objective attached to said housing and having an optical axis parallel to said housing axis, said objective further having an objective side nodal point and an image side nodal point, means for positioning the image normally produced at said image side nodal point at a fixed location exterior of said objective, a prism having a plane surface disposed transversely to said optical axis of the objective and passing through said image side nodal point image, a reference element on said plane surface of the prism, reflecting means pendulously suspended within said housing and spaced away from said objective, said reflecting means including a reflecting plane surface disposed transversely across said optical axis of the objective to always reflect light rays which emerge from said image side nodal point along a path through said image side nodal point, and optical means of said housing including a deflecting plane surface of said prism for observing said reference element, whereby said apparatus is optically self-levelling in respect of its collimation line.

3. Self-levelling optical apparatus according to claim 2 wherein said housing axis is substantially vertically disposed, said reflecting plane surface of the reflecting means is horizontally disposed, and said means for observing said reference element is horizontally disposed, and said housing further has optical means attached thereto at the objective side of said objective for receiving horizontal light rays and deflecting the same toward said objective side nodal point of the objective.

4. Self-levelling optical apparatus comprising a housing having an interior axis, an objective attached to said housing and having an optical axis parallel to said housing axis, said objective further having an objective side nodal point and an image side nodal point, prism means for producing an image of said image side nodal point at a fixed location exterior of said objective and laterally displaced from said optical axis of the objective, a reference element mounted within said housing at said location of said image side nodal point image, reflecting means pendulously suspended within said housing and spaced away from said objective, said reflecting means including a reflecting plane surface disposed transversely across said optical axis of the objective to always reflect light rays which emerge from said image side nodal point along a path through said image side nodal point, said prism being within said path of such reflected rays and having a deflecting plane surface for deflecting said reflected rays into a second path through said image side nodal point image, and means of said housing for observing said reference element, whereby said apparatus is optically self-levelling in respect of its collimation line.

5. Self-levelling optical apparatus according to claim 4 wherein said housing axis is substantially vertically disposed, said reflecting plane surface of the reflecting means is horizontally disposed, and said means for observing said reference element is horizontally disposed, and said housing further has optical means attached thereto at the objective side of said objective for receiving horizontal light rays and deflecting the same toward said objective side nodal point of the objective.

References Cited in the file of this patent

UNITED STATES PATENTS

| | | |
|---|---|---|
| 921,773 | Wild | May 18, 1909 |
| 2,386,621 | Luboshez | Oct. 9, 1945 |
| 2,701,501 | Cuny | Feb. 8, 1955 |
| 2,830,488 | Agnew | Apr. 18, 1958 |